Figure 1:
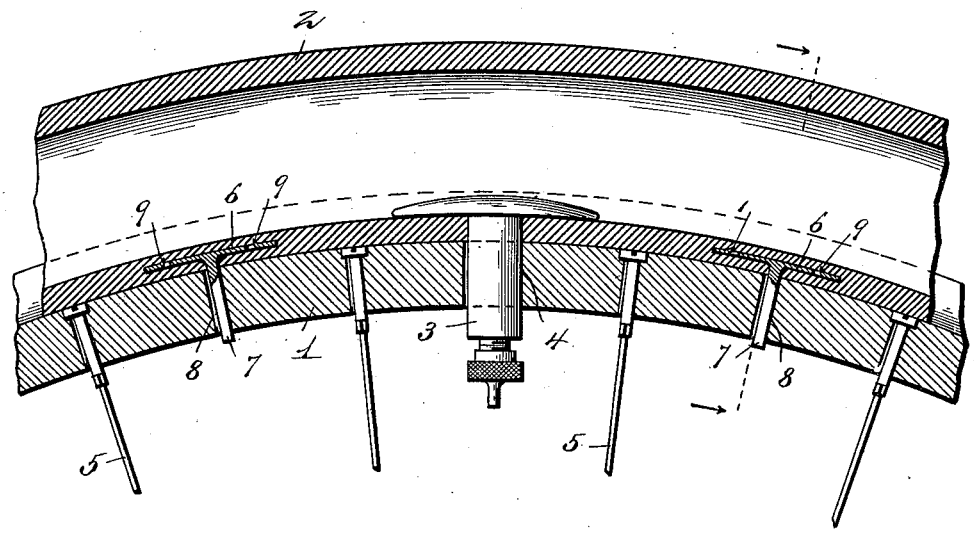

No. 656,054. Patented Aug. 14, 1900.
W. E. SMITH.
VALVE PROTECTOR AND FASTENER FOR PNEUMATIC TIRES.
(Application filed Apr. 10, 1900.)
(No Model.)

Witnesses
Harry L. Amer
F. M. Smith

Inventor
William E. Smith.
By Rexford M. Smith
Attorney

THE NORRIS PETERS CO., PHOTO-LITHO., WASHINGTON, D. C.

UNITED STATES PATENT OFFICE.

WILLIAM E. SMITH, OF JOHNSTOWN, PENNSYLVANIA.

VALVE PROTECTOR AND FASTENER FOR PNEUMATIC TIRES.

SPECIFICATION forming part of Letters Patent No. 656,054, dated August 14, 1900.

Application filed April 10, 1900. Serial No. 12,307. (No model.)

*To all whom it may concern:*

Be it known that I, WILLIAM E. SMITH, a citizen of the United States, residing at Johnstown, in the county of Cambria and State of Pennsylvania, have invented a certain new and useful Valve Protector and Fastener for Pneumatic Tires, of which the following is a specification, reference being had therein to the accompanying drawings.

This invention relates to valve protectors and fasteners for pneumatic tires, the object in view being to provide mechanical fastening means, used with or without the usual cement, for holding the tire in the rim.

The fasteners are especially designed to hold the tire against longitudinal movement on the rim, or, in other words, to prevent what is known as "creeping," the result of which, as is well understood, is to gradually chafe, weaken, and finally break off the valve-tube, which projects inward from the tire and passes through the usual valve-opening in the rim.

The detailed objects and advantages of the invention will more fully appear in the course of the ensuing description.

The invention consists in a valve protector and fastener for pneumatic tires embodying certain novel features and details of construction and arrangement of parts, as hereinafter fully described, illustrated in the drawings, and incorporated in the claim.

Figure 3:
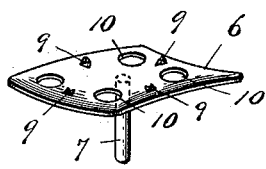
Figure 4:
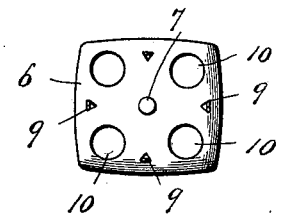
Figure 2:
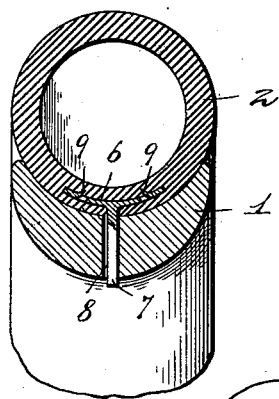

In the accompanying drawings, Figure 1 is a longitudinal sectional view of a tire and rim, showing two fasteners applied thereto. Fig. 2 is a cross-sectional view of the tire and rim, showing one of the fasteners. Fig. 3 is a detail perspective view of one of the fasteners. Fig. 4 is a bottom plan view of one of the fasteners.

Similar numerals of reference are employed to indicate corresponding parts in all the figures of the drawings.

Referring to the drawings, 1 designates a vehicle-wheel rim, and 2 a pneumatic tire applied thereto. The tire may be either of the single or double tube type, the fastener being equally applicable to both forms of tire. The tire is equipped with the usual valve-tube 3, which passes through an opening 4 in the rim. 5 designates the wheel-spokes.

I preferably employ two fasteners, which are arranged at opposite sides of the valve and at points equidistant therefrom, as shown in Fig. 1, and also midway between adjacent spokes, as shown in the same figure. Each fastener comprises a head 6, in the form of a sheet-metal plate, and a pin 7 connected at one end to the center of the head or plate 6 and adapted to be received in an opening 8 in the rim 1, as shown at Figs. 1 and 2. The head 6 is curved longitudinally, as shown in Figs. 1 and 3, to conform to the circumference or curvature of the tire and rim, and it is also curved or dished transversely, as shown in Figs. 2 and 3, to conform to the cross-sectional curvature of the tire and tire-receiving surface of the rim. The head 6 is further punched at several points to form outwardly-projecting integral barbs 9, which become embedded in the rubber tire, and thereby obtain a firm hold thereon. The head 6 is also provided with a series of openings 10, which serve a twofold purpose—first, to skeletonize and reduce the weight of the head 6, and, secondly, to allow the material of which the tire is composed to enter and fill the openings, thus securely anchoring the head or plate 6 in the body of the rubber at the rim-engaging portion thereof, as shown in Fig. 2.

It will be understood from the foregoing and by reference to Figs. 1 and 2 that the head or plate 6 is embedded and concealed and entirely inclosed within the material of the tire, the tire in the process of manufacture being molded around said head or plate and passing through the openings 10, and also forming around the barbs 9. By locating a fastener at each side of the valve tube or stem the tire is prevented from creeping as to that portion which lies adjacent to the valve-tube, thus preventing the valve tube or stem from becoming worn at its junction with the tire and finally breaking off or tearing, so as to leak and permit the air within the tire to escape. The openings 8 in the rim may pass only partially or entirely therethrough, as may be preferred.

Having thus described the invention, what is claimed as new is—

The combination with a wheel-rim, and a pneumatic tire having a valve-tube passing through an opening in the rim, of a pair of fasteners located on opposite sides of the valve-tube and each comprising a pin removably fitted in an opening in the rim, and a head in the form of a sheet-metal plate to which the pin is secured, said head being provided with a plurality of openings for the reception of the tire material and further punched to form a series of barbs which are embedded in the tire material, the head being inclosed and concealed within the rim portion of the tire, substantially as specified.

In testimony whereof I affix my signature in presence of two witnesses.

WILLIAM E. SMITH.

Witnesses:
E. O. FISHER,
JOHN K. POTTS.